United States Patent
Baba

[11] Patent Number: 5,953,296
[45] Date of Patent: *Sep. 14, 1999

[54] OPTICAL INFORMATION RECORDING/ REPRODUCING APPARATUS AND METHOD WITH AUTOMATIC SERVO LOOP ADJUSTMENT FUNCTION

[75] Inventor: Hisatoshi Baba, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/656,432

[22] Filed: May 30, 1996

[30] Foreign Application Priority Data

Jun. 1, 1995 [JP] Japan .................................... 7-134960

[51] Int. Cl.$^6$ ........................................................ G11B 7/09
[52] U.S. Cl. ..................................... 369/44.32; 369/44.26; 369/44.29; 369/44.35; 369/54
[58] Field of Search .............................. 369/44.26, 44.29, 369/44.35, 44.36, 54, 44.32, 44.25

[56] References Cited

U.S. PATENT DOCUMENTS

| | | | |
|---|---|---|---|
| 4,858,214 | 8/1989 | Baba ........................................... | 369/32 |
| 4,890,273 | 12/1989 | Takeuchi et al. ........................... | 369/45 |
| 4,955,011 | 9/1990 | Baba ........................................... | 369/54 |
| 5,568,461 | 10/1996 | Nishiuchi et al. ........................ | 369/44.26 |

FOREIGN PATENT DOCUMENTS

| | | |
|---|---|---|
| 0 478 314 A2 | 4/1992 | European Pat. Off. . |
| 0 607 445 A1 | 7/1994 | European Pat. Off. . |
| 6176404 | 6/1994 | Japan . |

OTHER PUBLICATIONS

Patent Abstracts of Japan, vol. 95, No. 8, published Sep. 29, 1995, an English Abstract of JP 07-129975, published May 19, 1995.

Patent Abstracts of Japan, vol. 95, No. 8, published Sep. 29, 1995, an English Abstract of JP 07-121891, published May 12, 1995.

Patent Abstracts of Japan, vol. 96, No. 4, published Apr. 30, 1996, an English Abstract of JP 07-320285, published Dec. 8, 1995.

Patent Abstracts of Japan, vol. 96, No. 6, published Jun. 28, 1996, an English Abstract of JP 08-030975, published Feb. 2, 1996.

*Primary Examiner*—Thang V. Tran
*Attorney, Agent, or Firm*—Fitzpatrick, Cella, Harper & Scinto

[57] ABSTRACT

An optical information recording/reproducing apparatus for recording and/or reproducing information on or from both a land portion and a groove portion of a recording medium using a light beam includes a focus servo for adjusting a focus state of the light beam, and a tracking servo for adjusting a tracking state of the light beam. Parameters of the tracking servo and focusing servo are checked in state in which the light beam is being traced on the land portion and in a state in which the light beam is being traced on the groove portion, respectively. The focus servo and/or the tracking servo adjusts the focus state and/or tracking state of the light beam on the basis of the parameters.

12 Claims, 7 Drawing Sheets

OPTICAL INFORMATION RECORDING/ REPRODUCING APPARATUS AND METHOD WITH AUTOMATIC SERVO LOOP ADJUSTMENT FUNCTION

BACKGROUND OF THE INVENTION

1. Field of the Invention

The present invention relates to an optical information recording/reproducing apparatus which records information on an information recording medium by using a laser beam and, more particularly, to control of a laser beam spot in an optical information recording/reproducing apparatus which uses, as information tracks, both track grooves (guide grooves: grooves) formed in a disk- or card-like recording medium and portions other than the track grooves (portions other than the guide grooves: lands) to record/reproduce information along the information tracks.

2. Related Background Art

In an optical information recording/reproducing apparatus, a light beam emitted from a semiconductor laser is formed into a spot with a diameter of about 1 $\mu$m through an objective lens and irradiated on an optical disk. To focus this small light spot on the medium surface of the optical disk, feedback loop control called focusing servo is normally used.

To position the light spot on spiral or concentric information tracks on the medium surface, a tracking servo loop is used. These control loops are normally constituted by the following elements.

1. An optical sensor for receiving a light beam reflected by the disk.
2. An amplifier for amplifying an output from the optical sensor.
3. A control stabilizing compensator for stabilizing an output from the amplifier.
4. An objective lens actuator for focusing the light beam on the disk.

A focusing direction position error between the light spot and the optical disk surface is detected on the basis of the amount of light received by the optical sensor, and the objective lens is moved by the actuator, thereby controlling the position of the light spot on the disk surface. Similarly, a tracking direction position error between the track on the disk and the light spot is detected on the basis of the amount of light received by the optical sensor, and the objective lens is moved by the actuator, thereby controlling the position of the light spot on the track.

In recent years, a technique has been used to increase the data memory capacity, in which both guide grooves (grooves) constituting the tracks and portions other than the guide grooves (lands) are used as data tracks. For example, Japanese Laid-Open Patent Application No. 6-176404 discloses an apparatus which records information at both lands and grooves formed in a three-dimensional structure. This apparatus employs a technique of inverting the tracking servo polarity to track the lands and grooves. This prior art also discloses a technique of specifying an arbitrary track by recording address information in the disk as a three-dimensional pattern, i.e., a so-called embossed pit.

This recording technique using both the guide grooves and the portions other than the guide grooves as information tracks to increase the track density is called land/groove recording. In land/groove recording, the track pitch becomes much smaller than that of a conventional technique using only lands or grooves as recording tracks. For example, in a 3.5-inch magnetooptical disk with an ISO standard capacity of 230 MB, the track pitch is about 1.4 $\mu$m. To perform land/groove recording at this pitch, a groove structure with a 0.7-$\mu$m land width and a 0.7-$\mu$m groove width is used. In land/groove recording, therefore, the track pitch is 0.7 $\mu$m, i.e., ½ that of the 230-MB magnetooptical disk device. For this reason, a highly precise tracking servo is required to realize land/groove recording. In addition, to properly record a signal at such a small track width, or to prevent a signal from being recorded at an adjacent track, the focus servo must be highly precise because an increase in light spot size caused due to defocusing is fatal.

In an actual optical information recording/reproducing apparatus, however, an offset of an electrical circuit, an error in attachment of an optical component, or the like generates an offset in a position error signal such as a focus error signal or a tracking error signal, resulting in a large obstacle against construction of a highly precise servo system.

A small difference between the land width and the groove width cannot be avoided. For this reason, a servo signal, a focus error signal, or a tracking error signal generated upon detecting the light beam reflected by the guide grooves of the disk changes to some extent between the lands and the grooves, so the servo system cannot be constituted by one circuit.

As for a light spot, the difference between a mode wherein the light beam is irradiated on a land and a mode wherein the light beam is irradiated on a groove corresponds to the difference between a mode wherein the light beam is irradiated on the projecting portion of the track and a mode wherein the light beam is irradiated on the recessed portion of the track. For this reason, a focus or tracking error signal changes to some extent. Particularly, when the optical system has an aberration, this difference increases to degrade the imaging performance. Therefore, the characteristic difference between the lands and the grooves poses a serious problem.

SUMMARY OF THE INVENTION

The present invention has been made to solve the above problems, and has as its object to provide an optical information recording/reproducing apparatus with a high reliability in its recording/reproducing operation, which eliminates the characteristic difference between lands and grooves, realizes a highly precise focus servo and tracking servo, and achieves high-density large-capacity information recording.

It is another object to provide an optical information recording/reproducing apparatus which can easily and quickly eliminate the characteristic difference between lands and grooves by recording in advance an adjustment signal on an optical disk.

It is still another object of the present invention to provide an apparatus which can eliminate the characteristic difference between lands and grooves by arranging, in the apparatus, an adjustment signal recording means for recording an adjustment signal and referring to crosstalk not only from a follow-up track but also from adjacent tracks even when a disk without an adjacent signal is used.

It is still another object of the present invention to eliminate the characteristic difference between lands and grooves by detecting the characteristic difference with a detection means for detecting abnormalities in the focus servo and the tracking servo of an optical information recording/reproducing apparatus for performing land/groove recording.

It is still another object of the present invention to provide an optical information recording/reproducing apparatus with a high reliability and a large capacity by eliminating the influence of the gain difference or offset difference in focus error signals or tracking error signals between lands and grooves.

In order to achieve the above objects, according to the present invention, there is provided an optical information recording/reproducing apparatus which records and/or reproduces information on/from both a land portion and a groove portion, which are formed on a recording medium, by using a light beam, comprising:

a focus servo for adjusting a focus state of the light beam;

a tracking servo for adjusting a tracking state of the light beam; and means for checking a parameter of the focus servo and/or the tracking servo in a mode wherein the light beam is tracing the land portion and in a mode wherein the light beam is tracing the groove portion, wherein the focus servo and/or the tracking servo adjusts the focus state and/or the tracking state of the light beam on the basis of the parameter checked by the check means.

There is also provided an optical information recording/reproducing apparatus which records and/or reproduces information on/from both a land portion and a groove portion, which are formed on a recording medium, by using a light beam, comprising:

a focus servo for adjusting a focus state of the light beam on the basis of a focus error signal representing the focus state of the light beam;

a tracking servo for adjusting a tracking state of the light beam on the basis of a tracking error signal representing the tracking state of the light beam; and means for switching an offset signal to be added to the focus error signal and/or the tracking error signal to compensate an offset included in the focus error signal and/or the tracking error signal between a mode wherein the light beam is tracing the land portion and a mode wherein the light beam is tracing the groove portion.

There is also provided an optical information recording/reproducing apparatus which records and/or reproduces information on/from both a land portion and a groove portion, which are formed on a recording medium, by using a light beam, comprising:

a focus servo for adjusting a focus state of the light beam on the basis of a focus error signal representing the focus state of the light beam;

a tracking servo for adjusting a tracking state of the light beam on the basis of a tracking error signal representing the tracking state of the light beam; and means for switching a determination level value of the focus error signal and/or the tracking error signal used to detect a deviation of the focus servo and/or the tracking servo between a mode wherein the light beam is tracing the land portion and a mode wherein the light beam is tracing the groove portion.

There is also provided an optical information recording/reproducing method used to record and/or reproduce information on/from both a land portion and a groove portion, which are formed on a recording medium, by using a light beam, comprising the steps of:

adjusting a focus state of the light beam by a focus servo;

adjusting a tracking state of the light beam by a tracking servo; and checking a parameter of the focus servo and/or the tracking servo in a mode wherein the light beam is tracing the land portion and in a mode wherein the light beam is tracing the groove portion, wherein the focus servo and/or the tracking servo adjusts the focus state and/or the tracking state of the light beam on the basis of the parameter checked in the step of checking the parameter.

There is also provided an optical information recording/reproducing method used to record and/or reproduce information on/from both a land portion and a groove portion, which are formed on a recording medium, by using a light beam, comprising the steps of:

adjusting a focus state of the light beam on the basis of a focus error signal representing the focus state of the light beam;

adjusting a tracking state of the light beam on the basis of a tracking error signal representing the tracking state of the light beam; and switching an offset signal to be added to the focus error signal and/or the tracking error signal to compensate an offset included in the focus error signal and/or the tracking error signal between a mode wherein the light beam is tracing the land portion and a mode wherein the light beam is tracing the groove portion.

There is also provided an optical information recording/reproducing method used to record and/or reproduce information on/from both a land portion and a groove portion, which are formed on a recording medium, by using a light beam, comprising the steps of:

adjusting a focus state of the light beam by a focus servo using a focus error signal representing the focus state of the light beam;

adjusting a tracking state of the light beam by a tracking servo using a tracking error signal representing the tracking state of the light beam; and switching a determination level value of the focus error signal and/or the tracking error signal used to detect a deviation of the focus servo and/or the tracking servo between a mode wherein the light beam is tracing the land portion and a mode wherein the light beam is tracing the groove portion.

DETAILED DESCRIPTION OF THE PREFERRED EMBODIMENTS

First Embodiment (A) Outline of Automatic Servo System Adjustment

Figure 2:
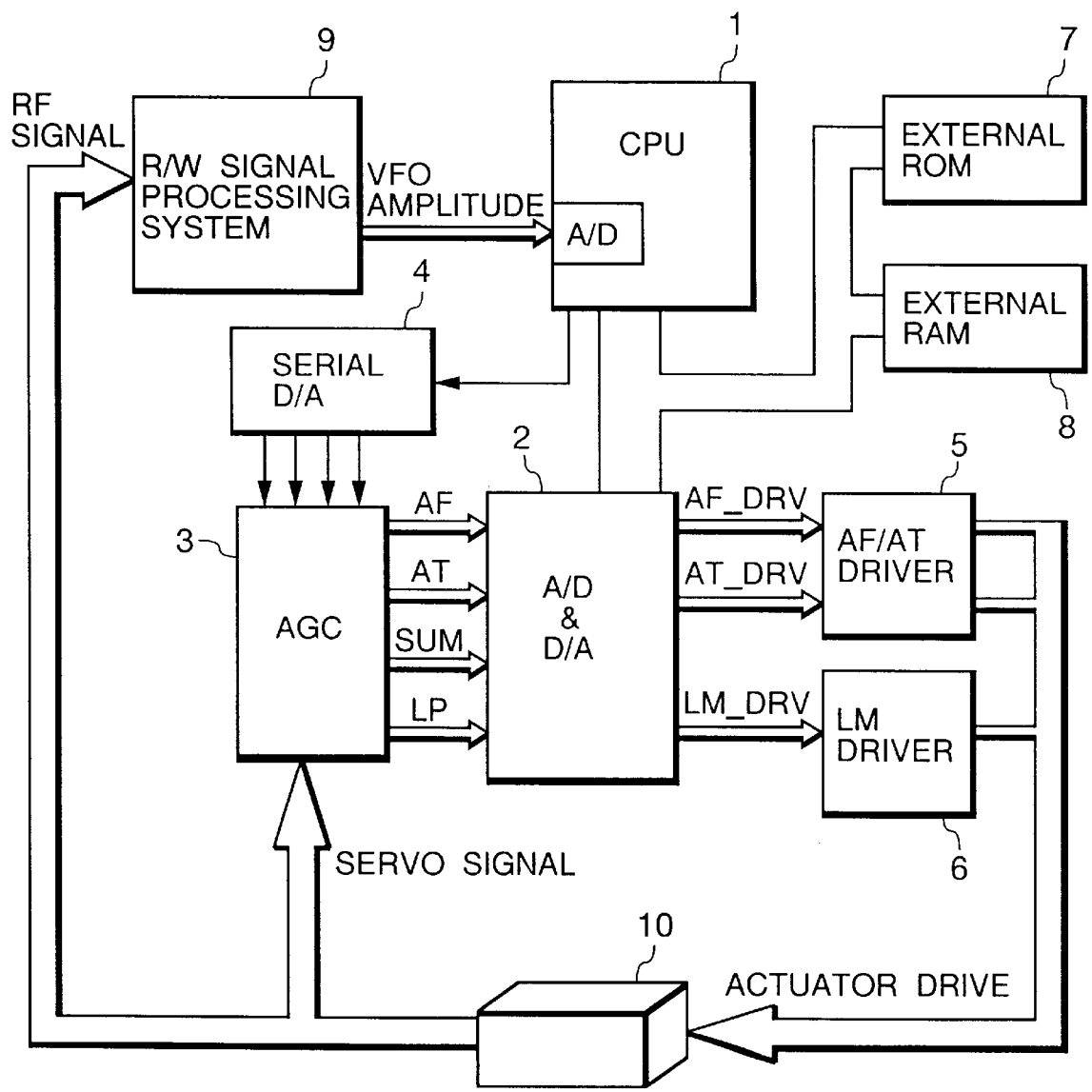
FIG. 2 is a block diagram of hardware in the optical information recording/reproducing apparatus of the present invention.

The hardware arrangement of an optical information recording/reproducing apparatus according to the present invention will be described. FIG. 2 is a block diagram showing the hardware arrangement of the servo system of a magnetooptical disk device of the present invention.

Servo processing of this embodiment is performed by software servo processing by a CPU 1. Most of automatic servo system adjustment is also performed as firmware processing in the CPU 1. Threshold setting for a track counting comparator (not shown) requiring a high-speed operation and offset adjustment of an AGC 3 cannot be processed in the CPU 1, so that a voltage is set in an external device by a serial D/A converter 4. The respective constituent elements will be described below.

(a) CPU 1

The CPU 1 is a CPU of a RISC type and incorporates a hardware multiplier, so that multiplication of 16*16=32 bits can be performed in 150 ns. The CPU 1 also incorporates a 10-bit A/D converter of eight channels.

(b) A/D & D/A Converter Unit 2

The 8-bit A/D converter has input terminals of eight channels by time division. In the 8-channel scanning operation, the total channel conversion time is 1.7 $\mu$s. The 8-bit D/A converter has output terminals of four channels and a settling time of about 3 $\mu$s.

(c) Serial D/A Converter 4

The D/A converter 4 is a serial communication type 8-bit D/A converter of 12 channels and operates at a low speed with a settling time of 300 $\mu$s.

(d) AGC 3

Upon receiving servo sensor outputs of eight channels, the AGC 3 generates servo signals such as a focus (AF) error signal, a tracking (AT) error signal and a total light amount (SUM) signal and performs a normalizing (AGC) operation of the servo signal. Upon receiving an output from a lens position sensor, the AGC 3 generates a lens position (LP) signal and performs an APC operation of the lens position LED.

(e) AF/AT Driver 5

The AF/AT driver 5 has a bridge output power operational amplifier of two channels. Upon receiving an AF/AT drive signal, the AF/AT driver 5 drives the actuator at a maximum drive current of 0.7 A.

(f) LM Driver 6

The LM driver 6 has a voice coil driver. Upon receiving an LM drive signal, the LM driver 6 drives the actuator at a maximum output of 2 A.

(g) External ROM 7 and External RAM 8

Although the CPU 1 incorporates a ROM and a RAM, the external ROM 7 and the external RAM 8 are used because of the small memory capacity of the CPU 1. These memories are mainly used for the processing unit of the system control system and are used for processing except the real-time processing of the servo system, which can be performed at a low speed. A portion of the automatic adjustment system, which requires a large memory area but no high-speed operation, uses the external RAM.

(h) R/W Signal Processing System 9

The R/W signal processing system 9 is used for processing of an RF signal. The R/W signal processing system 9 generates a magnetooptical signal amplitude necessary for automatic adjustment of an AF offset value, an AT offset value, an AF deviation detection level, or an AT deviation detection level, or the hold value of a VFO amplitude.

(i) Mechatronics (mechanics and electronics) 10

The mechatronics 10 is a mechatronics for a 3.5-inch magnetooptical disk, which is constituted by a head for a normal magnetooptical disk, a spindle motor for rotating the disk, and the like. The mechatronics 10 incorporates an optical head of a separation optical type like that mounted in a normal magnetooptical disk device. An objective lens mounted on a carriage as a movable portion can be moved by the actuator in the focusing and tracking directions. By moving this objective lens, focus and tracking servo operations are performed. A sensor for detecting the relative position of the carriage and the objective lens along the tracking direction is arranged. The sensor is used to drive the carriage in a tracking operation or fix the position of the objective lens during a seeking operation. This sensor is called an objective lens position sensor and also called as a "len position" sensor because it detects the lens position. The detection technique of this sensor can be realized by fixing an optical light-emitting/light-receiving element such as a photointerruptor at the carriage portion and placing a light-shielding plate engaging with the objective lens in the optical path of the photointerruptor.

On the basis of a servo signal from the optical head in the mechatronics 10 portion, the AGC 3 generates or normalizes a servo signal. This servo signal is digitized by the A/D converter of the A/D & D/A converter unit 2.

(j) Focus Servo Loop

The focus servo loop will be described. A focus error signal (AF in FIG. 2) output from the AGC 3 is converted into a digital value by the A/D & D/A converter unit 2. On the basis of this digital value, filter calculation for stabilizing the servo loop is performed by the CPU 1. The calculation result is output to the D/A converter of the A/D & D/A converter unit 2 and converted into an analog signal (AF DRV in FIG. 2). A focusing actuator in the mechatronics 10 is driven by the AF driver amplifier of the AF/AT driver 5.

(k) Tracking Loop

The tracking loop is formed in the similar manner. The tracking loop has elements for inverting the signal polarity to switch between a land portion tracking mode and a groove portion tracking mode. This will be described later in detail.

Figure 1:
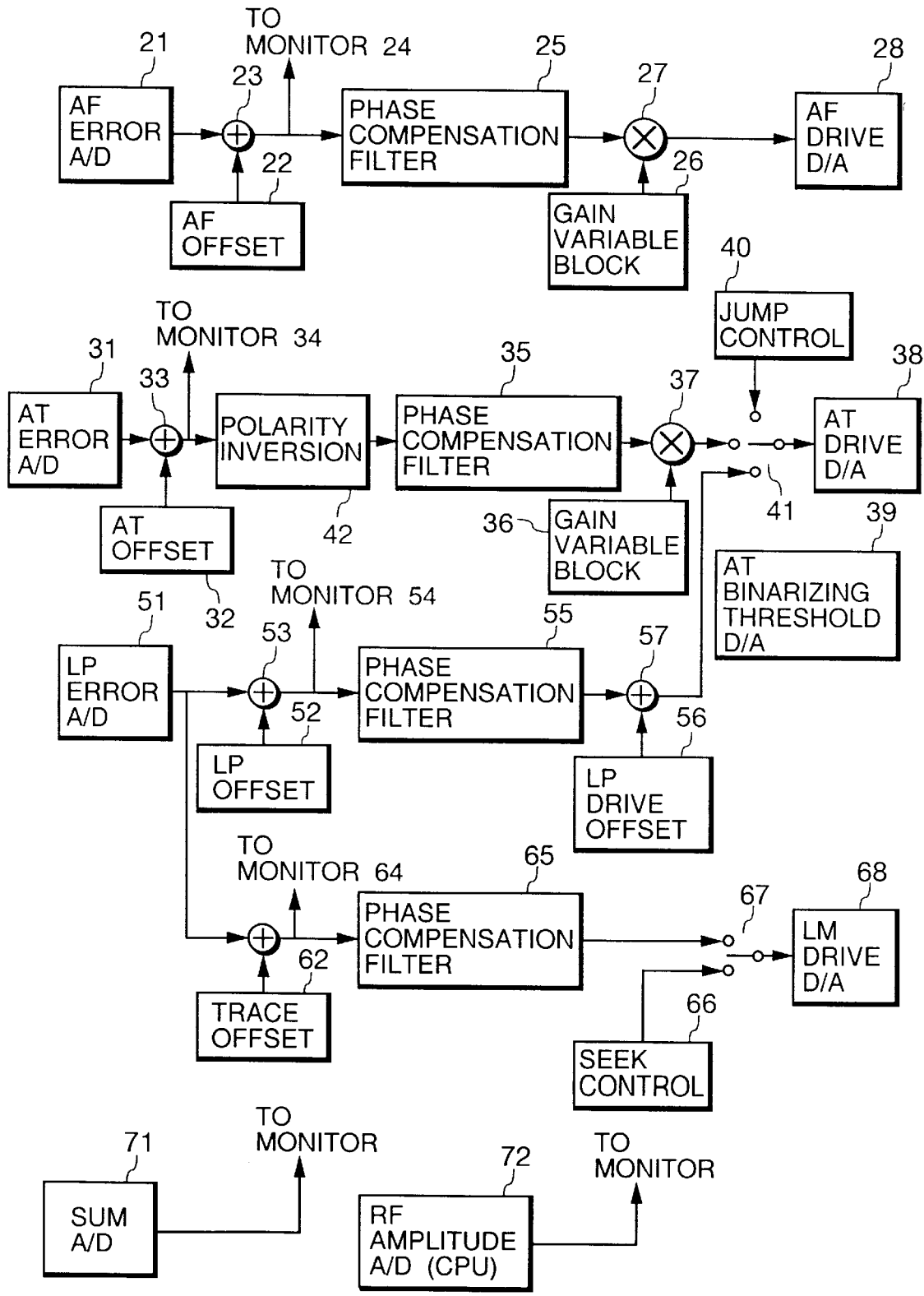
FIG. 1 is a block diagram of a servo system in an optical information recording/reproducing apparatus of the present invention.

FIG. 1 is a block diagram showing a servo system function according the first embodiment of the present invention. Most of the automatic servo system adjustment operations are performed at the stage of numerical data in the CPU 1. Part of processing is performed using the external serial D/A converter 4.

(B) Focus Servo System

A focus error signal from the mechatronics 10 is input to the AGC 3 and then to the A/D converter portion of the A/D & D/A converter unit 2. The data converted into a digital value is AF error data. The AF error data is added to AF offset data by an adder 23, so that offset-adjusted AF error data is obtained. The data at a monitoring point 24 is fundamental data of the AF error and used as an error signal for focus servo or for monitor such as focus deviation detection.

In an automatic adjustment operation, in two modes, i.e., in a land portion tracking mode and a groove portion tracking mode, the value of the AF offset is outputing by the AF offset block 22 and is actually changed, and the RF signal amplitude is monitored, thereby finding an optimum focus point.

Data calculated by a phase compensation filter 25 is multiplied by a multiplier 27 with data of a gain variable block 26 for adjusting a loop gain and output to a D/A converter portion 28 of the A/D & D/A converter unit 2. The gain variable block is also adjusted to an optimum value in the two modes, i.e., in the land portion tracking mode and the groove portion tracking mode.

(C) Tracking Servo System

The tracking servo system basically has the same arrangement as that of the focus servo system. A tracking error signal from the mechatronics 10 is input to the AGC 3 and normalized. The signal is input from the AGC 3 to the A/D converter portion of the A/D & D/A converter unit 2. The data converted into a digital value is AT error data. AT offset block 32 corrects not only a DC offset but also an offset of the lens position. Switching between the land portion tracking mode and the groove portion tracking mode is performed by inverting the polarity of the tracking error signal by a polarity inversion block 42.

In an automatic adjustment operation, in the two modes, i.e., in the land portion tracking mode and the groove portion tracking mode, the value of the AT offset is outputting by AT offset block 32 and is actually changed, and the RF signal amplitude is monitored, thereby finding the optimum tracking offset point.

An offset value is measured on the basis of a signal amplitude which appears at a monitoring point 34 when the AT offset value is set to be zero and the light spot crosses the tracks. An AT binarizing threshold value of D/A converter block 39 is set in accordance with the measurement value.

The AT actuator must be driven not only by the tracking servo but also by jump control block 40 and a lens position servo, and this operation is represented by a switch 41 in FIG. 1.

(D) Lens Position Servo System

The lens position servo system basically has the same arrangement as that of the focus servo system. An objective lens position sensor output from the mechatronics 10 is input to the AGC 3 and normalized. The data is input from the AGC 3 to the A/D converter portion of the A/D & D/A converter unit 2. The data converted into a digital value is LP error data. As in the focus servo system, this data is referred to by various functional modules as lens position data after LP offset correction calculation and adjustment at the first stage. Since no high gain precision is required, gain adjustment is not performed.

When the AT signal amplitude is to be measured, a light spot is forcibly caused to cross tracks. For this purpose, a low-frequency drive offset block 56 supplied drive offset data, to the output stage of the lens position servo system, thereby vibrating the objective lens.

(E) Trace Servo System

The LP error data is offset-adjusted by a trace offset block 62 and used by various functional modules. The trace offset block 62 has a function of canceling the decentering amount of a rotating disk. The CPU 1 has a spindle rotation synchronizing counter for counting about 100 pulses per revolution in synchronism with rotation of the spindle motor. In the trace operation, trace offset data corresponding to the decentering amount is updated in synchronism with the spindle rotation synchronizing counter, so that a lens position signal from which a decentering component is removed is obtained at a monitoring point 64. As in the AT servo, switching to a seek control block 66 is represented by a switch 67.

(F) SUM Signal System

A signal obtained by adding all outputs from a plurality of divided servo sensors is called a SUM signal. The SUM signal is converted into digital data by the A/D converter portion of the A/D & D/A converter unit 2, thereby determining AF deviation detection threshold data based on the SUM signal.

The AF deviation detection threshold data based on the SUM signal is also measured and determined in the two modes, i.e., in the land portion tracking mode and the groove portion tracking mode. Deviation detection is performed using threshold data corresponding to each mode.

Algorithms for setting an AF offset, an AT offset, an LP offset, a trace offset, and the like will be described below.

(1) AF Offset (Coarse Adjustment, Fine Adjustment, Deviation Detection Level)

Figure 3:
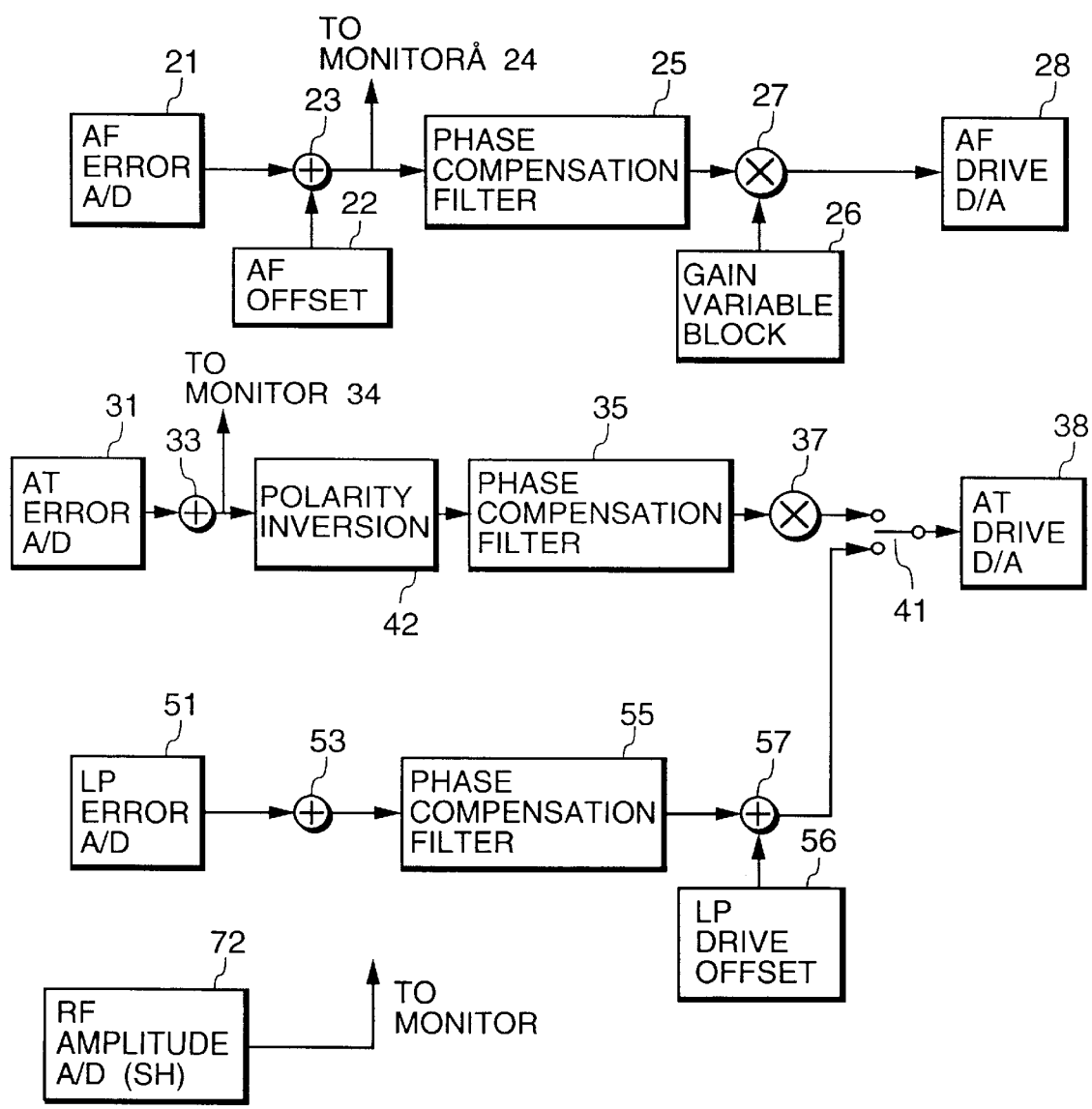
FIG. 3 is a block diagram of an automatic focus adjustment system of the present invention.

FIG. 3 is a block diagram showing parts extracted from the functional block diagram (FIG. 1) of automatic adjustment, which are particularly necessary for automatic AF offset adjustment.

Automatic focus offset adjustment is roughly classified into two automatic adjustment operations. One is an offset adjustment operation using a tracking error signal amplitude as a guideline. The other is a highly precise offset adjustment operation performed in the land portion tracking mode and the groove portion tracking mode by using a magnetooptical signal amplitude or VFO signal amplitude as a guideline. The former will be referred to as an "automatic AF offset adjustment operation using an AT signal amplitude" and the latter, an "AF offset adjustment operation using a VFO amplitude".

After the laser is turned on, and an AF operation is completed, the "automatic AF offset adjustment operation using an AT signal amplitude" is performed while rotating the disk at a predetermined speed. Thereafter, an AT operation is completed, and the "AF offset adjustment operation using a VFO amplitude" is performed in a trace state. In the trace state, the land portion tracking mode is set first, and a precision AF offset adjustment operation optimum for land tracking is performed. Thereafter, the groove portion tracking mode is set, and an AF offset adjustment operation optimum for groove tracking is performed.

These two automatic adjustment operations are independent modules. When both the automatic adjustment operations are completed, an AF offset is set by the "AF offset adjustment operation using a VFO amplitude".

The "automatic AF offset adjustment operation using an AT signal amplitude" and the "AF offset adjustment operation using a VFO amplitude" will be described below in detail.

In the "automatic AF offset adjustment operation using an AT signal amplitude", an automatic offset adjustment operation is performed in the servo state for automatic adjustment, i.e., after the AF servo loop is formed, and the AT actuator is held at the center by the lens position servo. The AT actuator is fixed by the lens position servo almost at the center of the movable range. At this time, to guarantee that the light spot crosses the tracks, the objective lens is finely vibrated. A drive signal of a sine wave with a predetermined period is supplied to the lens position servo loop, thereby vibrating the objective lens. For example, vibrations having a period of, e.g., about 100 Hz and an amplitude of about 10 to 20 $\mu$m are generated. As shown in FIG. 3, this drive signal is supplied as the LP drive offset 56 immediately before the D/A output of the lens position servo. This concerns a quantization error of the lens position servo. When a signal is supplied immediately before the D/A output, vibrations smoother than those generated by supplying a sine wave as a target value of the lens position servo loop can be generated. To generate smoother vibrations, the lens position servo band must be set low.

On the other hand, during the seeking operation, the lens position servo band must be set wide, i.e., the gain must be increased to minimize the vibration of the objective lens.

Therefore, the lens position servo band is set wide during the seeking operation, and otherwise, the lens position servo is set narrow. This arrangement can be achieved by changing the gain and filter characteristics of a phase compensation filter 55 in the CPU 1 between the seeking operation and other operations. This can be easily realized by a software servo using the CPU 1 without any obstacle.

When the lens position servo band is set wide during the seeking operation or narrow otherwise, the vibration of the objective lens can be minimized during the seeking operation. Therefore, an error in position or velocity, detected by a track count, caused by the vibration of the objective lens can be eliminated, so that a stable seeking operation can be performed.

When the lens position servo band is set narrow in the automatic AF offset adjustment operation, the objective lens can be smoothly moved. The light spot can be caused to cross the tracks of a disk without decentering. In addition, when the objective lens is smoothly moved, the signal waveform can be prevented from being distorted by an undesirable vibration, so that the precision of AT signal amplitude measurement can be increased.

Furthermore, when the lens position servo band is set narrow except during the seeking operation, the actuator can be prevented from undesirably receiving a driving force. With this arrangement, the power consumption can be decreased, and heat generation of the actuator can be prevented.

(2) Sequence of Adjustment

In an AF operation, the range of an offset value to be applied to the AF servo loop for adjustment is determined on the basis of the peak value data of the S-shaped characteristic curve of a measured focus error signal. The range is set to be, e.g., ½ the S-shaped peak value.

The offset value is changed at a resolution equally dividing the half of this peak value into eight segments. Measurement is performed at 17 points including the zero point and positive and negative points. First, the AT signal amplitude is measured at an offset value of 0, and the amplitude value and the offset value are stored in correspondence with each other.

The offset value is changed every step of the above resolution in the negative direction, and AT signal amplitude values at the respective steps and given offset values are stored in correspondence with each other. This operation is performed within the above range, i.e., up to eight steps.

Simultaneously, the maximum AT signal amplitude value is determined. When an AT signal amplitude value smaller than 80% of the maximum value is measured during step measurement, a sequence for inhibiting to increase the absolute value of the offset is taken. This is because the in-focus state must be prevented from being excessively degraded to cause a focus deviation.

The offset value is changed again up to the zero point. At this time, measurement in the positive direction is performed as in measurement in the negative direction. Upon completion of measurement at all points, the maximum AT signal amplitude value is found. An AF offset value for obtaining an amplitude value corresponding to 80% of the maximum value is calculated. This offset value smaller than 80% of the maximum amplitude value is obtained by linear interpolation based on the preceding and subsequent offset values. The average value, i.e., the medium of the offset values smaller than 80% of the maximum amplitude value in the positive and negative directions is obtained as a set offset. Finally, the offset is gradually changed up to the set offset. An abrupt change must be avoided because it causes a focus deviation. This offset value smaller than 80% of the maximum amplitude value can be set as a focus deviation detection threshold level.

(3) Method of Measuring AT Signal Amplitude

Basically, AT signal amplitude measurement is performed by peak-hold and bottom-hold operations. The attack/hold characteristics are set in consideration of the averaging effect such that an abrupt response to noise can be prevented. An amplitude is defined as ½ the difference between the peak and bottom values. Processing is performed at a servo interrupt timing of 50 kHz. The AT error A/D value is read, and in accordance with the difference in magnitude between the peak data value and the bottom data value, ⅛ the difference is added for the attack characteristics while $\frac{1}{1024}$ the difference is subtracted for the hold characteristics.

Figure 4:
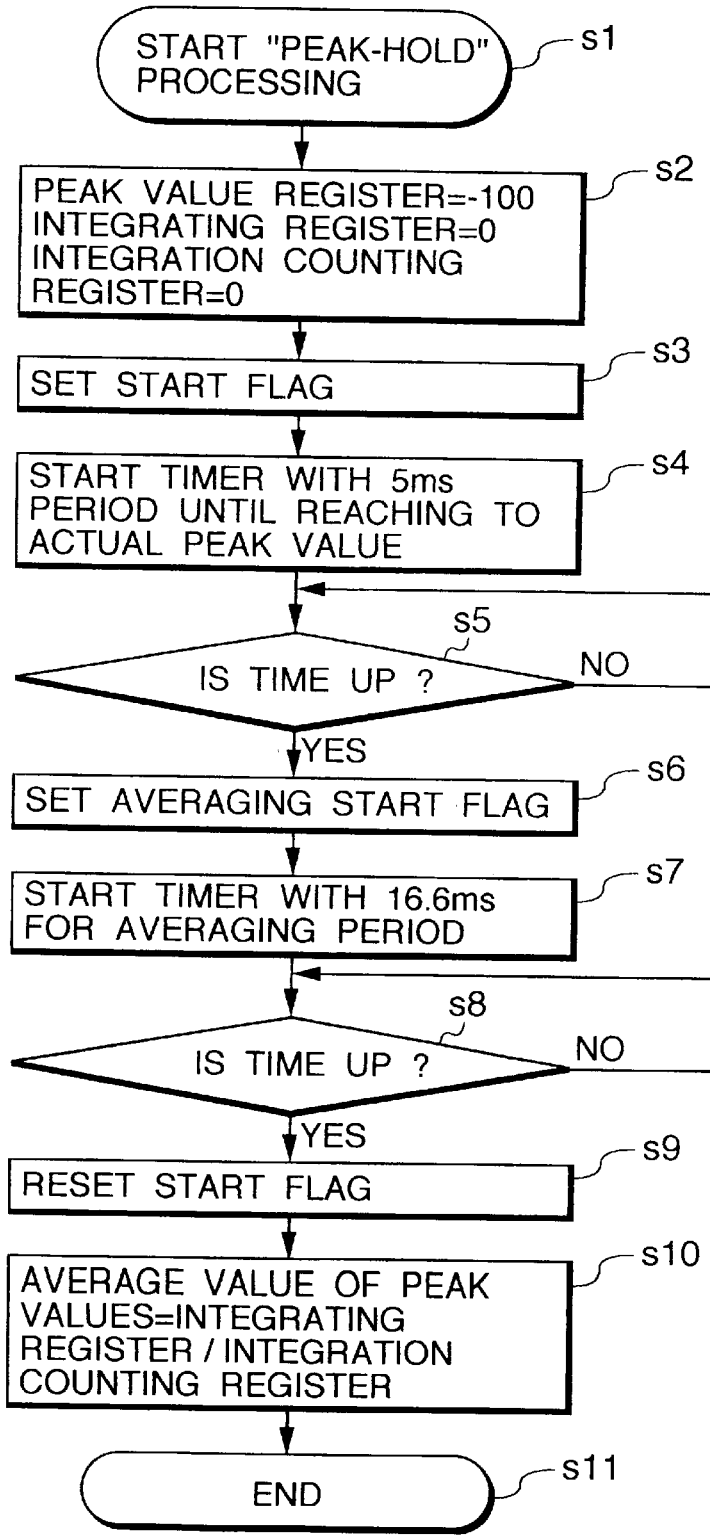
FIG. 4 is a flow chart (task portion) of tracking error signal amplitude measurement in the present invention.
Figure 5:
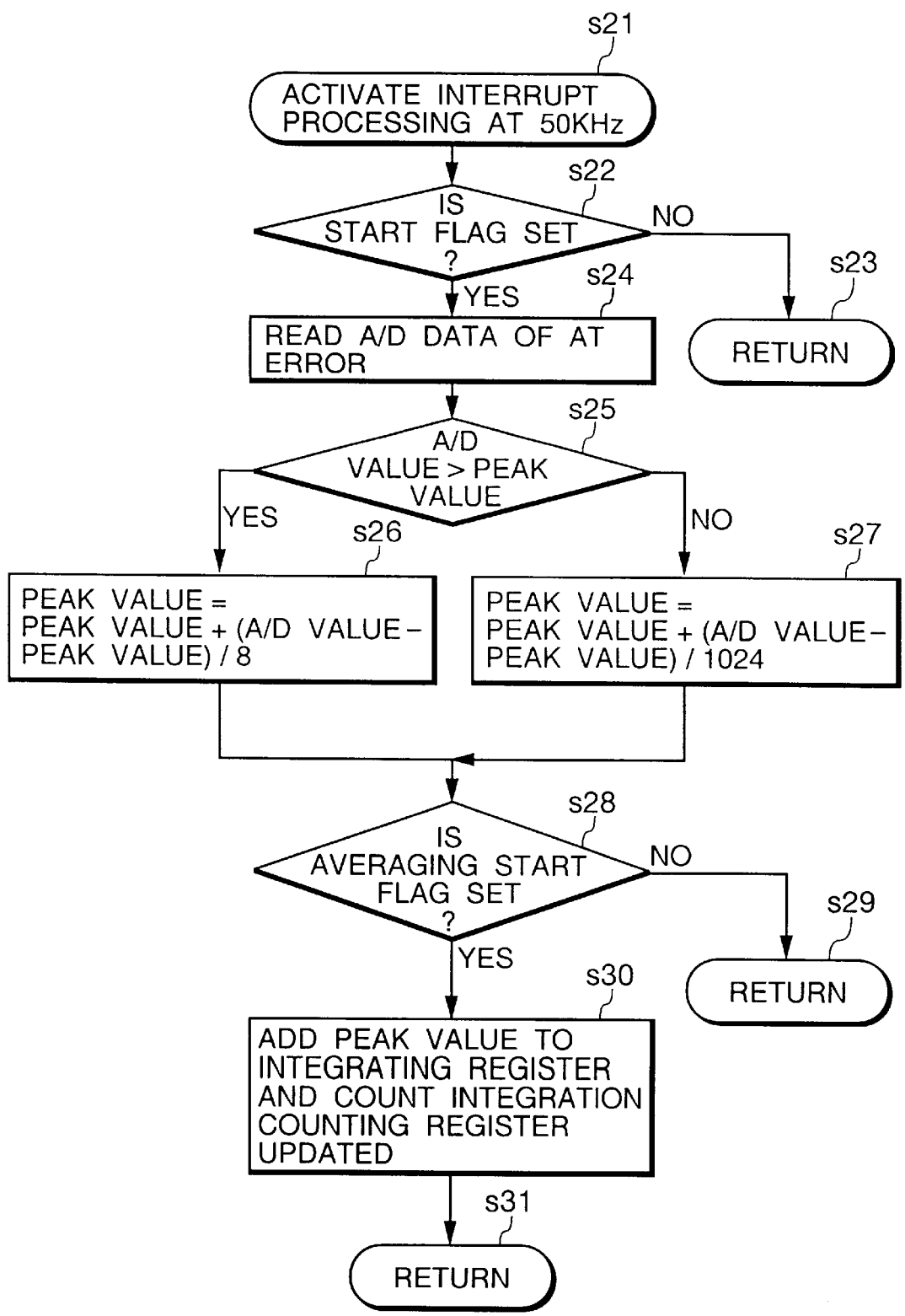
FIG. 5 is a flow chart (interrupt portion) of tracking error signal amplitude measurement in the present invention.

In parallel with the above processing, the peak/bottom data is integrated and averaged at a sampling timing of 50 kHz. For example, data for 16.6 ms corresponding to one revolution are averaged for one point of the applied focus offset value during measurement. This will be described below with reference to flow charts. FIG. 4 shows the main flow of AT signal amplitude measurement of the present invention. FIG. 5 shows the flow of an interrupt module.

Assume that the AT signal amplitude is ±100 when the light spot is crossing the tracks. A method of detecting the peak value on the +100 side will be described below. A method of detecting the negative peak (bottom) value on the −100 side can be easily realized only by considering the sign or magnitude, and a detailed description thereof will be omitted.

Peak-hold processing is started in step 1 (s1). In step 2 (s2), the averaging register or waveform peak value register is initialized. The peak value register is a register as the output terminal of AT error signal peak-hold processing. An integrating register is used to average the peak-hold values for a predetermined period. An integration counting register represents the number of times for integrating the peak-hold values in the integrating register. Therefore, the average peak value can be calculated as "integrating register value"/ "integration counting register value".

When the start flag is set in step s3, peak-hold processing in interrupt processing (to be described later) is started. In step s4, a 5-ms timer is started to wait until the initial value of the peak value register reaches the actual peak value.

It is determined in step s5 that the period of 5 ms has elapsed. In step s6, the averaging start flag is set. Thereafter, peak-hold processing is continuously performed in interrupt processing, and peak value integration processing is started.

In step s7, a timer for setting an averaging period is started. In this case, the averaging period is set at 16.6 ms corresponding to one revolution of the disk. Averaging for a period corresponding to one revolution of the disk also enables averaging variations along the circumferential direction of the disk.

It is determined in step s8 that the period of 16.6 ms has elapsed. In step s9, the start flag is reset to stop peak-hold and integration processing in interrupt processing. Thereafter, in step s10, the average value is calculated. When the integrating register value is divided by the integration counting register value, the average AT signal peak value during one revolution of the disk can be obtained.

Interrupt processing will be described below with reference to FIG. 5.

Interrupt processing is started at 50 kHz which is a fundamental sampling frequency of the servo system (s21). When interrupt processing is started, it is first checked in step s22 whether the start flag is set. Until the start flag is set in the main flow of FIG. 4 (s3), the flow advances to step s23 to end interrupt processing.

When the start flag is set, the flow advances to step s24 to perform peak-hold processing. In step s24, the AT error data is read. In step s25, the value of the AT error data is compared with the peak value of the peak value register. If the read value of the AT error data is larger than the peak value, the flow advances to step s26 to increase the peak value data of the peak value register. At this time, instead of setting the value of the AT error data as the peak value, the peak value is increased by only 1/8 the difference between the value of the AT error data and the previous peak value. With this processing, an erroneous peak-hold operation caused due to the flaws of the disk or noise can be prevented.

When the value of the AT error data is smaller than the peak value, the flow advances to step s27 to perform a hold operation. At this time as well, instead of only holding the peak value data, the peak value is gradually decreased by dividing the difference between the value of the AT error data and the previous peak value by 1024. With this processing, an erroneous peak-hold operation caused due to the flaws of the disk or noise can be prevented.

Upon completion of peak value processing, the flow advances to step s28 to check the averaging start flag. If the average start flag is not set in step s6 of the main flow of FIG. 4, the flow advances to step s29 to end interrupt processing. This sequence is performed during the timer period of 5 ms waiting until the peak value data reaches the actual peak value.

If the averaging start flag is set, the flow advances to step s30 to integrate the peak value register value in the integrating register and increment the integration counting register by one, thereby counting the number of times of integration. The flow advances to step s31 to end interrupt processing.

When the period of 16.6 ms set in the timer has elapsed in steps s7 and s8 of the main flow, the start flag is reset so neither peak-hold processing nor integration processing is performed. Using only data at discrete sampling points of 50 kHz, accurate peak and bottom values can be measured, and as a result, the AT error signal amplitude value and the offset value can be measured although the AT error signal obtained when the light spot is crossing the tracks is close to the sampling frequency, i.e., 5 to 10 kHz. In addition, when the peak value is processed on the basis of 1/8 or 1/1024 the data difference, a peak-hold operation free from noise can be achieved while appropriately setting the waiting time.

(4) "AF Offset Adjustment Operation Using VFO Amplitude"

A servo state for automatic adjustment in the AF offset adjustment operation using a VFO amplitude will be described. This adjustment operation is performed after the AF, AT, and trace servo loops are formed. As for the AT servo, the polarity inversion block 42 is at a positive polarity in the land portion tracking mode and at a negative polarity in the groove portion tracking mode. The amplitude of a magnetooptical signal or the amplitude of a VFO signal at an ID portion must be held. To obtain this VFO timing, the ID reproduction system must be normally operated, and address reproduction must be possible. At this time, the ID data portion can be either a signal recorded as an embossed pit or a signal recorded as a pit of magnetooptical recording.

As an adjustment means, the range of offset values to be applied to the AF servo loop for adjustment is determined on the basis of the AF-S peak value data which has been measured in an AF operation. The range is set to be, e.g., 1/2 the S-shaped peak value. The offset value is changed at a resolution equally dividing the half of this peak value into eight segments. Measurement is performed at 17 points including the zero point and positive and negative points. This measurement is performed in the land portion tracking mode and in the groove portion tracking mode to determine optimum AF offset values, respectively.

First, to set the land portion tracking mode, the polarity inversion block is set at the positive polarity. The magnetooptical signal amplitude or VFO signal amplitude is measured at an AF offset value of 0, and the amplitude value and the offset value are stored in correspondence with each other.

The offset is changed every step of the above resolution in the negative direction, and VFO signal amplitude values at the respective steps and given offset values are stored in correspondence with each other. This operation is performed within the above range, i.e., up to eight steps. Simultaneously, the maximum VFO signal amplitude value is determined. When a VFO signal amplitude value smaller than 80% of the maximum value is measured during step measurement, a sequence for inhibiting an increase in the absolute value of the offset is performed. This is because the in-focus state must be prevented from being excessively degraded to cause a focus deviation.

The offset value is changed again up to the zero point. At this time, measurement in the positive direction is performed as in measurement in the negative direction. Upon completion of measurement at all points, the maximum VFO signal amplitude value is found. An AF offset value for obtaining an amplitude value corresponding to 80% of the maximum value is calculated. This offset value smaller than 80% of the maximum amplitude value is obtained by linear interpolation based on the preceding and subsequent offset values. The average value, i.e., the medium of the offset values smaller than 80% of the maximum amplitude value in the positive and negative directions is obtained as a set offset. Finally, the offset is gradually changed up to the set offset. An abrupt change must be avoided because it causes a focus deviation. This offset value smaller than 80% of the maximum amplitude value can be set as a focus deviation detection threshold level.

To set the groove portion tracking mode, the polarity inversion block is set at the negative polarity. As in the land portion tracking mode, the offset value is changed at every step of the resolution in the negative direction, and VFO signal amplitude values at the respective steps and given offset values are stored in correspondence with each other. This operation is performed within the above range.

An AF offset value optimum for the groove portion tracking mode is determined. In addition, a deviation detection level for the groove portion tracking mode is determined.

The AF offset values and AF deviation detection levels determined in the land portion tracking mode and the groove portion tracking mode are independently stored.

The AF offset values and AF deviation detection levels are set in accordance with the tracking mode when data is to be reproduced or recorded, or when the light spot moves on the tracks in the seeking operation.

(5) Method of Measuring Magnetooptical Signal Amplitude or ID Portion VFO Signal Amplitude A method of measuring a magnetooptical signal amplitude or an ID portion VFO signal amplitude will be described below. Processing is performed at 1/8 a servo interrupt timing of 50 kHz. A magnetooptical signal amplitude or ID portion VFO amplitude data of the A/D converter of the CPU 1 are read, integrated, and averaged at a sampling timing of 1/8 of 50 kHz. For example, data for 10 ms are averaged for one point of the AF offset point.

(6) AT & SUM Offset (Fine Adjustment, Deviation Detection Level)

Figure 6:
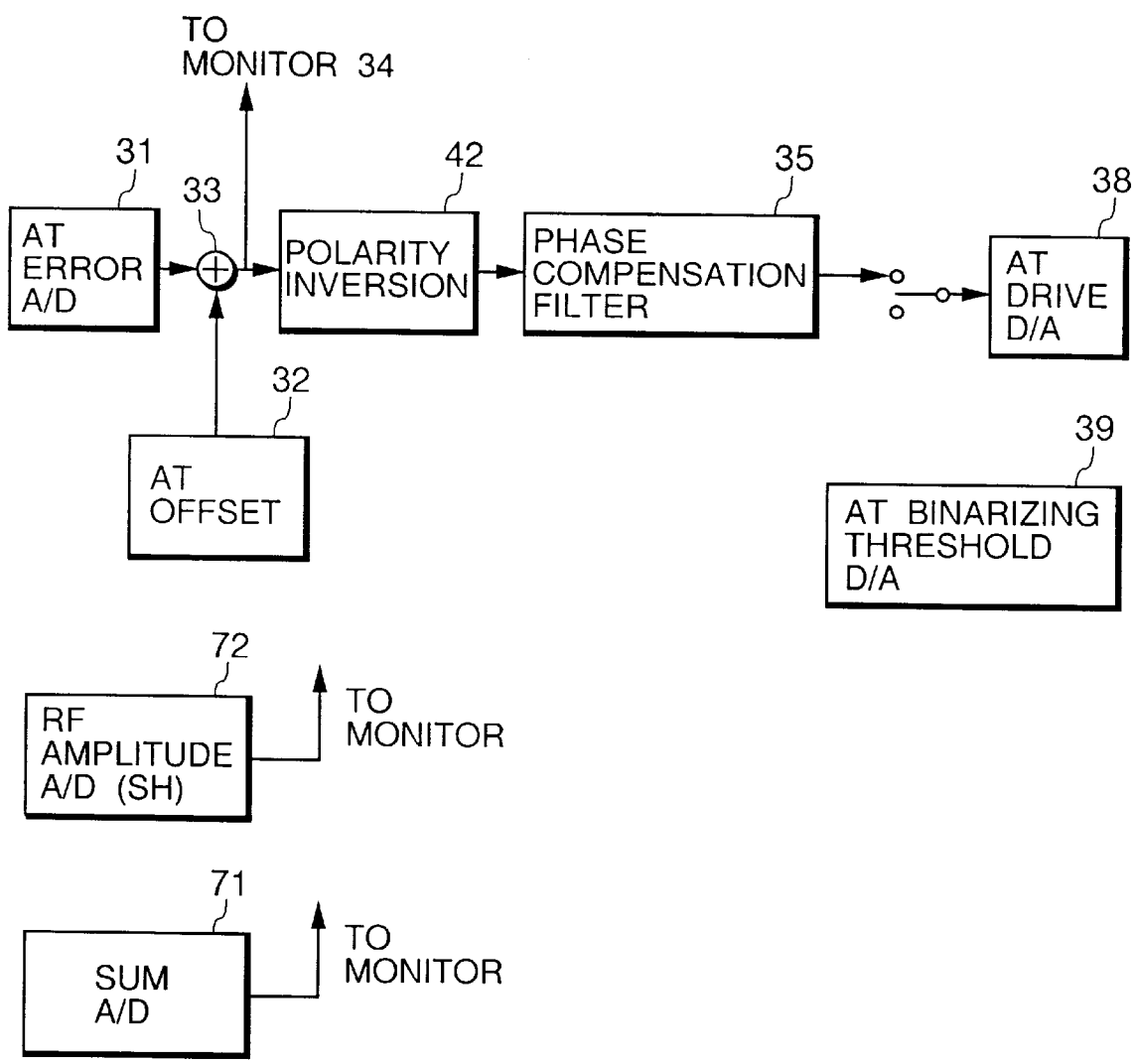
FIG. 6 is a block diagram of an automatic tracking adjustment system of the present invention.

FIG. 6 is a block diagram showing parts extracted from the functional block diagram (FIG. 1) of automatic adjustment, which are particularly necessary for automatic AT offset adjustment and automatic SUM signal adjustment.

Automatic AT offset adjustment is a highly precise offset adjustment operation performed in the land portion tracking mode and the groove portion tracking mode by using a magnetooptical signal amplitude or VFO signal amplitude as an index. Before this precise offset adjustment operation, coarse adjustment is performed in which the tracking error signal obtained when the light spot crosses tracks is measured, and a tracking servo target value is set almost at the central value. With this processing, even in a device or disk with a large offset, the land portion tracking mode and the groove portion tracking mode can be stably set.

Automatic SUM signal adjustment is used to detect a focus deviation by measuring the level of the SUM signal representing light totally reflected by the disk in the land portion tracking mode and the groove portion tracking mode. After the laser is turned on, and an AF operation is completed, the above-described coarse AT offset adjustment operation is performed while rotating the disk at a predetermined speed. Thereafter, upon completion of an AT operation, fine adjustment is performed in a trace state. In the trace state, the land portion tracking mode is set first, and a precision AT offset adjustment operation optimum for land tracking is performed. Thereafter, the groove portion tracking mode is set, and an AT offset adjustment operation optimum for groove tracking is performed.

The fine AT offset adjustment operation will be described below in detail. The fine AT offset adjustment operation is performed in the servo state for automatic adjustment, i.e., after the AF, AT, and trace servo loops are formed. As for the AT operation, the polarity inversion block 42 is set at the positive polarity in the land portion tracking mode and at the negative polarity in the groove portion tracking mode. The amplitude of a magnetooptical signal or the amplitude of a VFO signal at an ID portion must be held. To obtain this VFO timing, the ID reproduction system must be normally operated, and address reproduction must be possible.

The sequence of adjustment will be described below. The range of offset values to be applied to the AT servo loop for adjustment is determined on the basis of the amplitude value data of the tracking error signal which has been measured upon a coarse AT adjustment operation. The range is set to be, e.g., ½ the amplitude value of the AT error signal. The offset is changed at a resolution equally dividing the half of this amplitude value into eight segments. Measurement is performed at 17 points including the zero point and positive and negative points. This measurement is performed in the land portion tracking mode and in the groove portion tracking mode to determine optimum AT offset values, respectively.

First, to set the land portion tracking mode, the polarity inversion block is set at the positive polarity. The magnetooptical signal amplitude or VFO signal amplitude is measured at an AT offset value of 0, and the amplitude value and the offset value are stored in correspondence with each other. The offset value is changed at every step of the above resolution in the negative direction, and VFO signal amplitude values at the respective steps and given offset values are stored in correspondence with each other. This operation is performed within the above range, i.e., up to eight steps.

Simultaneously, the maximum VFO signal amplitude value is determined. When a VFO signal amplitude value smaller than 80% of the maximum value is measured during step measurement, a sequence for inhibiting an increase in the absolute value of the offset is performed. This is because the tracking state must be prevented from being excessively degraded to cause a tracking deviation.

The offset value is changed again up to the zero point. At this time, measurement in the positive direction is performed as in measurement in the negative direction. Upon completion of measurement at all points, the maximum VFO signal amplitude value is found. An AT offset value for obtaining an amplitude value corresponding to 80% of the maximum value is calculated. This offset value smaller than 80% of the maximum amplitude value is obtained by linear interpolation based on the preceding and subsequent offset values. The average value, i.e., the medium of the offset values smaller than 80% of the maximum amplitude value in the positive and negative directions is obtained as a set offset. Finally, the offset is gradually changed up to the set offset. An abrupt change must be avoided because it causes a tracking deviation.

This offset value smaller 80% of the maximum amplitude value can be set as a tracking deviation detection threshold level. To set the groove portion tracking mode, the polarity inversion block is set at the negative polarity. As in the land portion tracking mode, the offset value is changed at every step of the resolution in the negative direction, and VFO signal amplitude values at the respective steps and given offset values are stored in correspondence with each other. This operation is performed within the above range.

An AT offset value optimum for the groove portion tracking mode is determined. In addition, a deviation detection level for the groove portion tracking mode is determined.

The AT offset values and AT deviation detection levels determined in the land portion tracking mode and the groove portion tracking mode are independently stored. The AT offset values and AT deviation detection levels are set in accordance with the tracking mode when data is to be reproduced or recorded, or when the light spot moves on the tracks in the seeking operation.

(7) Method of Measuring Magnetooptical Signal Amplitude or ID Portion VFO Signal Amplitude A method of measuring an magnetooptical signal amplitude or an ID portion VFO signal amplitude will be described below. Processing is performed at ⅛ a servo interrupt timing of 50 kHz. A magnetooptical signal amplitude or ID portion VFO amplitude data of the A/D converter of the CPU 1 are read, integrated, and averaged at a sampling timing of ⅛ of 50 kHz. For example, data for 10 ms are averaged for one point of the AT offset point.

(8) "Automatic SUM Signal Adjustment"

Upon completion of fine AT offset adjustment, automatic SUM signal adjustment is performed. After the AT offset values optimum for the land portion tracking mode and the groove portion tracking mode are set, the SUM signal is measured. SUM data are averaged for a period of, e.g., 10 ms, thereby measuring the SUM signal level.

A focus deviation detection level corresponding to, e.g., ½ the measured level is used as a detection threshold level for detecting a focus deviation caused by an external vibration, impact, or flaws in disk during focus servo processing or after focus and tracking servo processing.

Because of asymmetry between the land portions and the groove portions of a disk, the difference in SUM signals between the land portions and the groove portions cannot be avoided. In the present invention, measurement and adjustment of SUM signals are performed at the land portions and the groove portions. With this processing, an erroneous deviation detection operation, i.e., a situation that "a focus deviation is detected when no focus deviation occurs" or "no focus deviation can be detected when a focus deviation occurs" can be prevented.

Second Embodiment

The second embodiment of the present invention will be described below.

In the first embodiment, a method of automatically adjusting the AF offset value and deviation detection, and the AT offset value and deviation detection in the land/groove recording apparatus has been described. In this embodiment, a disk used for automatic adjustment in the land/groove recording apparatus will be described. In the first embodiment, a magnetooptical signal or the VFO portion of the ID portion is reproduced, and the offset values and deviation detection levels are determined in accordance with the amplitude value. In the second embodiment, a method of recording a magnetooptical signal or the VFO portion of the ID portion will be described.

Tracks dedicated for automatic adjustment are arranged in manufacturing a disk, and automatic offset or deviation detection adjustment signals are recorded in the tracks. For example, assuming that an automatic focusing operation is performed on the inner peripheral side of the disk where the surface vibration is small, tracks dedicated for automatic adjustment are arranged at the inner peripheral portion. From the inner side, even-numbered tracks are assigned to land portions, and odd-numbered tracks are assigned to groove portions. Signals having a predetermined frequency are recorded at tracks of track numbers 10 to 20. A relatively high frequency usable for data recording is preferably used as the recording frequency. This is because a frequency higher than an optical spatial frequency determined on the basis of a spot size, i.e., a smaller data pit can conspicuously exhibit defocus characteristics.

Recording of automatic adjustment signals is performed at the time of shipment of the disk. When this disk is inserted into an optical information recording/reproducing apparatus, automatic adjustment of AF and AT offset values and deviation detection is performed, as in the first embodiment, using the range of track numbers 10 to 20.

With this arrangement, the automatic adjustment signals can always be properly ensured, so that the arrangement of the optical information recording/reproducing apparatus is simplified.

Third Embodiment

The third embodiment of the present invention will be described below.

In the first embodiment, a method of automatically adjusting the AF offset value and deviation detection, and the AT offset value and deviation detection in the land/groove recording apparatus has been described. In this embodiment, a method of a recording adjustment signal used for automatic adjustment in the land/groove recording apparatus will be described.

In the first embodiment, a magnetooptical signal or the VFO portion of the ID portion is reproduced, and the offset values and deviation detection levels are determined in accordance with the amplitude value. A method of recording this magnetooptical signal or the VFO portion of the ID portion will be described below. Automatic adjustment is performed upon starting the apparatus or inserting the disk.

At this time, an automatic focusing operation is often performed at a predetermined portion, e.g., on the inner peripheral side of the disk where the surface vibration is small. Therefore, tracks dedicated for automatic adjustment are arranged at the inner peripheral portion. From the inner side, even-numbered tracks are assigned to land portions, and odd-numbered tracks are assigned to groove portions. Tracks of track numbers 10 to 20 are ensured as an area dedicated for automatic adjustment (this area is set outside the user data area, as a matter of course). Signals having a predetermined frequency are recorded in this area before automatic adjustment. A relatively high frequency usable for data recording is preferably used as the recording frequency. This is because a frequency higher than an optical spatial frequency determined on the basis of a spot size, i.e., a smaller data pit can conspicuously exhibit defocus characteristics.

The automatic adjustment signals are recorded without offset adjustment. In recording, however, not so high precision is required of focusing and tracking operations as compared to signal reproduction because of the influence of grooves or thermal recording process. Therefore, even in a servo state without highly precise offset adjustment, sufficiently useful automatic adjustment signals can be recorded.

Recording of the automatic adjustment signals is performed before automatic adjustment which is performed upon starting the optical information recording/reproducing apparatus or inserting the disk. The automatic adjustment signals are recorded within the range of track numbers 10 to 20. Automatic adjustment of AF and AT offset values and deviation detection is performed, as in the first embodiment, using these signals.

With this arrangement, recording of automatic adjustment signals, which is always necessary in the second embodiment, becomes unnecessary, so that an inexpensive disk can be used. In addition, the apparatus performs recording, reproduction, and adjustment by itself, so that a highly precise automatic adjustment operation can be performed.

Fourth Embodiment

The fourth embodiment of the present invention will be described below.

Numbers are assigned to tracks on a disk, and tracks of numbers 10 to 30 are used for automatic adjustment. Even numbers are assigned to land portion tracks, and odd numbers are assigned to groove portion tracks.

For example, a signal having a predetermined period is recorded at the 12th track. No signal is recorded at the 11th track, i.e., the groove portion. A crosstalk component from the 12th track is measured while tracking the 11th track. As in the above embodiment, while changing the focus offset, a focus offset for minimizing the crosstalk is found and stored. Subsequently, while tracking the 13th track where no signal is recorded, an offset value for minimizing the crosstalk component from the 12th track is found. The average value of the optimum offsets obtained from the 11th and 13th tracks is calculated.

In this manner, a focus offset for minimizing the crosstalk from the adjacent track is found and set as a focus offset value in the groove portion tracking mode.

As for a land portion focus offset value, a signal is recorded at the 15th track. No signal is recorded at the 14th track, i.e., the land portion. A crosstalk component from the 15th track is measured while tracking the 14th track. As in the above embodiment, while changing the focus offset, a focus offset for minimizing the crosstalk is found and stored. Subsequently, while tracking the 16th track where no signal is recorded, an offset for minimizing the crosstalk component from the 15th track is found. The average value of the optimum offsets obtained from the 14th and 16th tracks is calculated.

In this manner, a focus offset for minimizing the crosstalk from the adjacent track is found and set as a focus offset in the land portion tracking mode.

Similarly, as for a tracking offset, an offset can be determined with reference to a crosstalk from an adjacent track. Signals having different frequencies and a predetermined period are recorded at the 20th and 22nd tracks. Automatic tracking offset adjustment is performed while tracking the 21st track, i.e., the groove portion. As in the first embodiment, while changing the tracking offset, an offset for minimizing crosstalk components from the adjacent tracks, i.e., the 20th and 22nd tracks is found and set as a groove portion tracking offset. However, since adjustment signals having different frequency components are recorded at the 20th and 22nd tracks, the crosstalk components from the tracks on both the sides of the 21st track are not canceled with each other. In addition, using the frequency difference, the crosstalk components from the 20th and 22nd tracks can be separated from each other to measure the crosstalk amounts on the left and right sides, respectively. Therefore, adjustment can be performed such that both the values are minimized.

In offset adjustment in the land portion tracking mode, signals are recorded at the 25th and 27th tracks. While tracking the 26th track, i.e., the land portion track, the offset is changed, thereby determining an optimum land portion tracking offset.

In this embodiment, the 10th to 30th tracks are used. However, the number of recording tracks for adjustment and the number of measurement tracks are not limited to those of this embodiment. In some cases, the inner peripheral portion and the outer peripheral portion of the disk have different focus offset amounts and different tracking offset amounts. For this reason, recording tracks for adjustment and measurement tracks may be arranged at the respective portions.

As described above, when the focus and tracking offsets are determined on the basis of crosstalk components from adjacent tracks such that the influence of the crosstalk is minimized, crosstalk components from the adjacent tracks, which pose a serious problem for a small track pitch, can be minimized, so that a highly reliable optical information recording/reproducing apparatus free from data errors can be realized.

These adjustment signals can be recorded at predetermined track numbers as automatic adjustment signals having a predetermined frequency in manufacturing the disk. In this case, the apparatus can be simplified.

Furthermore, these automatic adjustment signals can be recorded not in manufacturing the disk but by the optical information recording/reproducing apparatus before the automatic adjustment operation. With this arrangement, the number of steps in manufacturing the disk is decreased, so that an inexpensive disk can be manufactured.

Fifth Embodiment

The fifth embodiment of the present invention will be described below in which a gain variable block 26 in FIG. 1 is adjusted.

Figure 7:
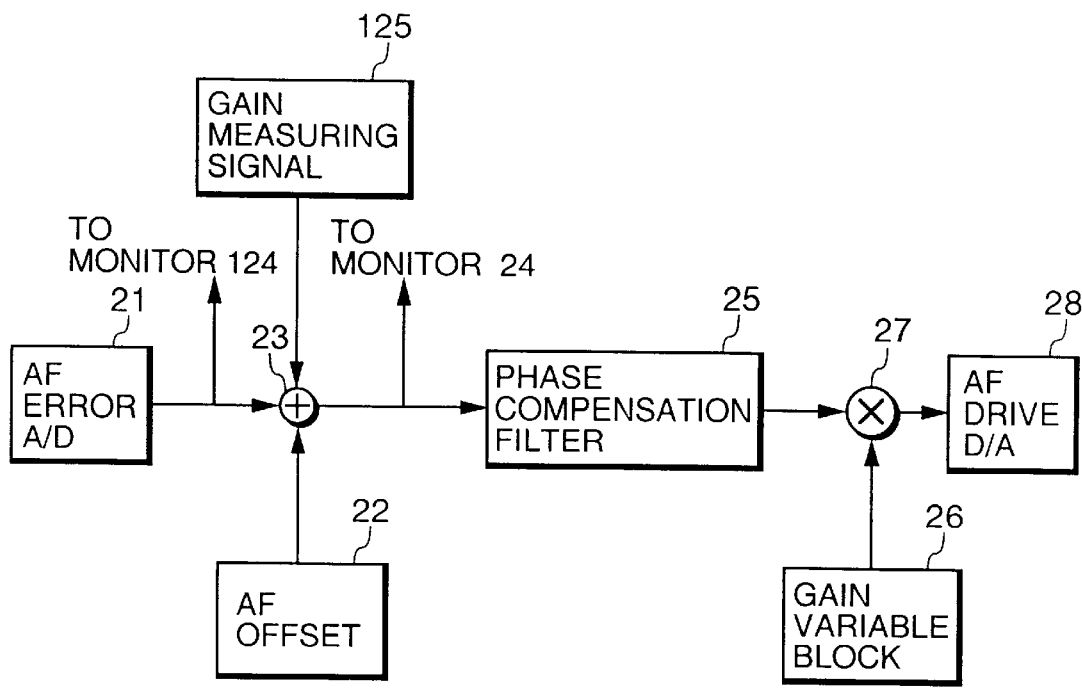
FIG. 7 is a block diagram of an automatic focus gain adjustment system of the present invention.

FIG. 7 is a block diagram for automatic focus loop gain adjustment. A gain measuring block 125 and a monitoring point 124 are added to the subsequent stage of an AF error A/D block 21 in FIG. 1. A gain measuring signal supplies a sine wave of several kHz to an adder 23 to measure the servo loop gain, and the open-loop gain of the servo loop is measured by a monitoring point 24 and the monitoring point 124.

After the focus servo loop and the tracking servo loop are formed, and offset adjustment is completed, automatic open-loop gain adjustment for the focus servo loop is performed. First, the land portion tracking mode is set. Normally, the focus servo loop band is set within the range of about 3 to 5 kHz. Therefore, a signal of about 3 kHz is preferably used as the gain measuring signal. In a digital servo, a data table having sine wave data can be prepared, and the data can be changed and supplied to the adder 23 in units of sampling frequencies.

The signal of 3 kHz, which is supplied in this manner, is transferred in the focus servo loop. In this arrangement, the relationship between an output from the adder 23, i.e., the monitoring point 24, and an input to the adder 23, i.e., the monitoring point 124 has a close relationship with the open-loop transfer gain of the focus servo loop.

In this embodiment, when the gain measuring signal of 3 kHz is supplied, a value obtained by dividing the amplitude of the signal of 3 kHz at the monitoring point 124 by that at the monitoring point 24 corresponds to a gain at 3 kHz of the open-loop transfer characteristics of the focus servo loop.

Using this nature, open-loop gain adjustment of the focus servo is performed. For example, when the servo band is to be set to 3 kHz, the amplitudes of the signals of 3 kHz at the monitoring point 24 and the monitoring point 124 are equalized, i.e., set to 0 dB. With this processing, the open-loop transfer characteristics of the focus servo loop can be set to 0 dB at 3 kHz.

To change the loop gain, the gain variable block 26 is changed. Assume that, when the gain of the gain variable block 26 is set to 100, and automatic focus open-loop gain adjustment is started, the amplitude value of the signal of 3 kHz at the monitoring point 24 is "50", and the amplitude value of the signal of 3 kHz at the monitoring point 124 is "40". In this case, the gain at 3 kHz is 40/50=0.8. Therefore, the gain of the gain variable block 26 must be increased, so that a gain of 125 corresponding to 1.25 times (1.25 is the reciprocal of 0.8) the set gain is set in the gain variable block 26. With this processing, the open-loop gain of the focus servo loop can be automatically adjusted.

The set value of the gain variable block 26 is stored as a focus servo gain set value in the land portion tracking mode.

The tracking mode is switched to the groove portion tracking mode, and open-loop gain adjustment of the focus servo is performed again. The sequence is the same as that in the land portion tracking mode. A signal of 3 kHz is supplied from the gain measuring block to the adder 23, and the set value of the gain variable block 26 is adjusted such that the amplitude value of the signal of 3 kHz at the monitoring point 24 is equalized with that at the monitoring point 124.

The set value of the gain variable block 26 is stored as the focus servo gain set value in the groove portion tracking mode. The value of the gain variable block 26 is set in accordance with the tracking mode when data is to be reproduced/recorded or when the light spot moves on tracks in the seeking operation.

When optimum gain parameters of the focus servo loop are set in the land portion tracking mode and in the groove portion tracking mode, respectively, a stable and highly precise focus servo loop can be constituted even when the focus error signal characteristics of the land portions are different from those of the groove portions.

Sixth Embodiment

The sixth embodiment of the present invention will be described below in which a gain variable block 36 at the subsequent stage of an AT error A/D block 31 shown in FIG. 1 is adjusted.

Figure 8:
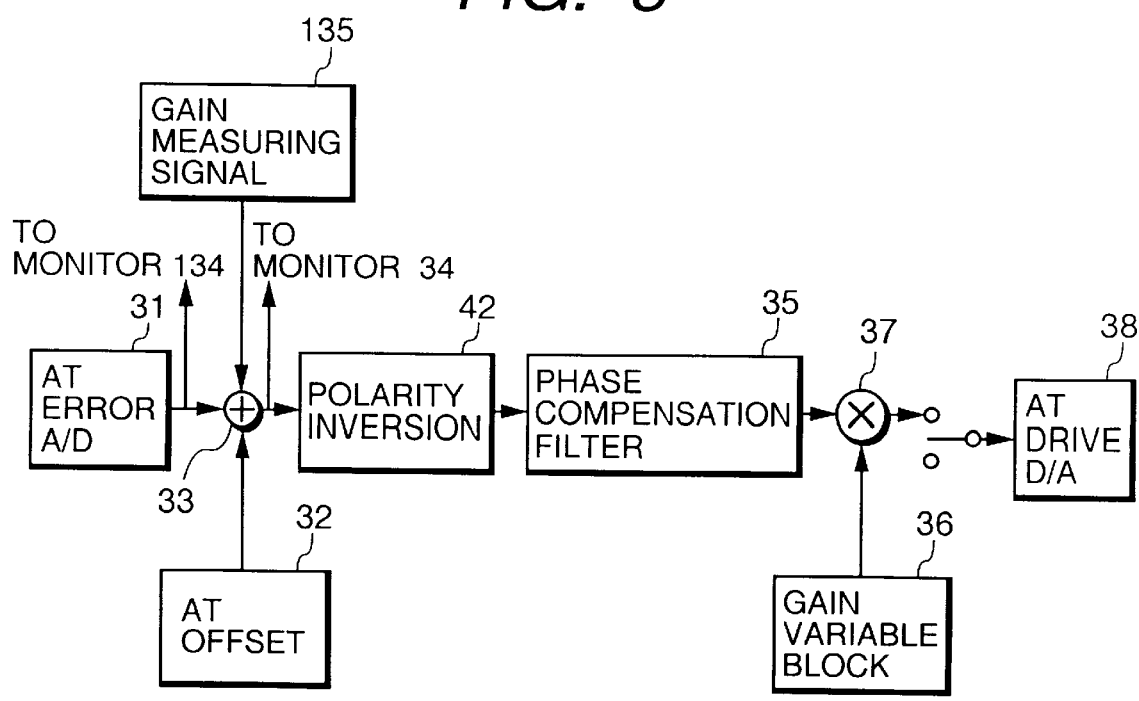
FIG. 8 is a block diagram of the automatic tracking adjustment system of the present invention.

FIG. 8 is a block diagram for automatic tracking loop gain adjustment. A gain measuring signal block 135 and a monitoring point 134 are added to an AT offset block 32 shown in FIG. 1. The gain measuring signal block 135 supplies a sine wave of several kHz to an adder 33 to measure the servo loop gain, and the open-loop gain of the servo loop is measured by a monitoring point 34 and the monitoring point 134.

After the focus servo loop and the tracking servo loop are worked, and offset adjustment described above is completed, automatic open-loop gain adjustment of the tracking servo is performed. First, the land portion tracking mode is set. Normally, the tracking servo loop band is set within the range of about 3 to 5 kHz. Therefore, a signal of about 3 kHz is preferably used as the gain measuring signal. In a digital servo, a data table having sine wave data can be prepared, and the data can be changed and supplied to the adder 33 in units of sampling frequencies.

The signal of 3 kHz, which is supplied in this manner, is transferred in the tracking servo loop. In this arrangement, the relationship between an output from the adder 33, i.e., the monitoring point 34, and an input to the adder 33, i.e., the monitoring point 134 has a close relationship with the open-loop transfer gain of the tracking servo loop.

In this embodiment, when the gain measuring signal of 3 kHz is supplied, a value obtained by dividing the amplitude of the signal of 3 kHz at the monitoring point 134 by that at the monitoring point 34 corresponds to a gain at 3 kHz of the open-loop transfer characteristics of the tracking servo loop. Using this nature, open-loop gain adjustment of the tracking servo loop is performed.

For example, when the servo band is to be set to 3 kHz, the amplitudes of the signals of 3 kHz at the monitoring point 34 and the monitoring point 134 are equalized, i.e., set to 0 dB. With this processing, the open-loop transfer characteristics of the tracking servo loop can be set to 0 dB at 3 kHz. To change the loop gain, a gain variable block 36 is changed.

Assume that, when the gain of the gain variable block 36 is set to 100, and automatic tracking open-loop gain adjustment is started, the amplitude value of the signal of 3 kHz at the monitoring point 34 is "50", and the amplitude value of the signal of 3 kHz at the monitoring point 134 is "40". In this case, the gain at 3 kHz is 40/50=0.8. Therefore, the gain of the gain variable block 36 must be increased, so that a gain of 125 corresponding to 1.25 times (1.25 is the reciprocal of 0.8) the set gain is set in the gain variable block 36. With this processing, the open-loop gain of the tracking servo loop can be automatically adjusted. This set value of the gain variable block 36 is stored as the tracking servo gain set value in the land portion tracking mode.

The tracking mode is switched to the groove portion tracking mode, and open-loop gain adjustment of the tracking servo loop is performed again. The sequence is the same as that in the land portion tracking mode. A signal of 3 kHz is supplied from the gain measuring block to the adder 33, and the set value of the gain variable block 36 is adjusted such that the amplitude value of the signal of 3 kHz at the monitoring point 34 is equalized with that at the monitoring point 134. This set value of the gain variable block 36 is stored as the tracking servo gain set value in the groove portion tracking mode.

The value of the gain variable block 36 is set in accordance with the tracking mode when data is to be reproduced/recorded or when the light spot moves on tracks in the seeking operation.

When optimum gain parameters of the tracking servo loop are set in the land portion tracking mode and the groove portion tracking mode, respectively, a stable and highly precise tracking servo loop can be constituted even when the tracking error signal characteristics of the land portions are different from those of the groove portions.

Automatic adjustment according to each of the above embodiments is executed at least once when the disk is inserted into the apparatus or before the information recording/reproducing operation.

What is claimed is:

1. An optical information recording/reproducing apparatus for effecting recording of information on and/or reproduction of information from both a land portion and a groove portion provided on a recording medium with a light beam, comprising:

focusing servo means for adjusting a focusing state of the light beam, said focusing servo means including at least means for detecting reflected light of the light beam from the recording medium and for generating a focusing error signal;

tracking servo means for adjusting a tracking state of the light beam, said tracking servo means including at least means for detecting reflected light of the light beam from the recording medium and for generating a tracking error signal;

means for inverting the polarity of said tracking error signal so as to select a first mode in which said land portion is traced with the light beam or a second mode in which said groove portion is traced with the light beam;

means for setting a first threshold level for detecting focusing state abnormalities in the first mode and a second threshold level for detecting focusing state abnormalities in the second mode each independently; and means for comparing the focusing error signals generated in the first and second modes with the first and second threshold levels, respectively, and for determining that a focusing state abnormality is caused when the focusing error signal exceeds the threshold level.

2. An apparatus according to claim 1, wherein an examining signal with a definite frequency is recorded on a part of said land portion and on a part of said groove portion and said setting means sets the first and second threshold levels on the basis of the amplitude of a reproduction signal obtained by reproducing the examining signal.

3. An optical information recording/reproducing apparatus for effecting recording information on and/or reproduction of information from both a land portion and a groove portion provided on a recording medium with a light beam, comprising:

focusing servo means for adjusting a focusing state of the light beam, said focusing servo means including at least means for detecting reflected light of the light beam from the recording medium and for generating a focusing error signal;

tracking servo means for adjusting a tracking state of the light beam, said focusing servo means including at least means for detecting reflected light of the light beam from the recording medium and for generating a tracking error signal;

means for inverting the polarity of said tracking error signal so as to select a first mode in which said land portion is traced with the light beam or a second mode in which said groove portion is traced with the light beam;

means for setting a first threshold level for detecting tracking state abnormalities in the first mode and a second threshold level for detecting tracking state abnormalities in the second mode each independently; and means for comparing the tracking error signals generated in the first and second modes with the first and second threshold levels, respectively, and for determining that a tracking state abnormality is caused when the tracking error signal exceeds the threshold level.

4. An apparatus according to claim 3, wherein an examining signal with a definite frequency is recorded on a part of said land portion and on a part of said groove portion and said setting means sets the first and second threshed levels on the basis of the amplitude of a reproduction signal obtained by reproducing the examining signal.

5. An optical information recording/reproducing apparatus for effecting recording of information on and/or reproduction of information from both a land portion and groove portion provided on a recording medium with a light beam, comprising:

focusing servo means for adjusting a focusing state of the light beam, said focusing servo means including at least means for detecting reflected light of the light beam from the recording medium with a sensor having a divided light-receiving surface and for generating a focusing error signal;

tracking servo means for adjusting a tracking state of the light beam, said tracking servo means including at least means for detecting reflected light of the light beam from the recording medium and for generating a tracking error signal; and means for inverting the polarity of said tracking error signal so as to select a first mode in which said land portion is traced with the light beam or a second mode in which said groove portion is traced with the light beam;

means for setting a first threshold level for detecting focusing state abnormalities in the first mode and a second threshold level for detecting focusing state abnormalities in the second mode each independently;

means for generating a sum signal from outputs of the divided light-receiving surfaces of said sensor in the first and second modes; and means for comparing the sum signals generated in the first and second modes with the first and second threshold levels, respectively, and for determining that a focusing state abnormality is caused when the sum signal exceeds the threshold level.

6. An optical information recording/reproducing apparatus for effecting recording of information on and/or reproduction of information from both a land portion and a groove portion provided on a recording medium with a light beam, comprising;

focusing servo means for adjusting a focusing state of the light beam, said focusing servo means including at least means for detecting reflected light of the light beam from the recording medium and for generating a focusing error signal;

tracking servo means for adjusting a tracking state of the light beam, said tracking servo means including at least means for detecting reflected light of the light beam from the recording medium with a sensor having a divided light-receiving surface and for generating a tracking error signal;

means for inverting the polarity of said tracking error signal so as to select a first mode in which said land portion is traced with the light beam or a second mode in which said groove portion is traced with the light beam;

means for setting a first threshold level for detecting tracking state abnormalities in the first mode and a second threshold level for detecting tracking state abnormalities in the second mode each independently;

means for generating a sum signal from outputs of the divided light-receiving surfaces of said sensor in the first and second modes; and means for comparing the sum signals generated in the first and second modes with the first and second threshold levels, respectively, and for determining that a tracking state abnormality is caused when the sum signal exceeds the threshold level.

7. An optical information recording/reproducing method for effecting recording of information on and/or reproduction of information from both a land portion and a groove portion provided on a recording medium with a light beam, said method comprising the steps of:

detecting reflected light of the light beam from the recording medium and generating a focusing error signal;

effecting a focusing servo for adjusting a focusing state of the light beam on the basis of the generated focusing error signal;

detecting reflected light of the light beam from the recording medium and generating a tracking error signal;

effecting a tracking servo for adjusting a tracking state of the light beam on the basis of the generated tracking error signal;

inverting the polarity of said tracking error signal so as to select a first mode in which said land portion is traced with the light beam or a second mode in which said groove portion is traced with the light beam;

setting a first threshold level for detecting focusing state abnormalities in the first mode and a second threshold level for detecting focusing state abnormalities in the second mode each independently; and comparing the focusing error signals generated in the first and second modes with the first and second threshold levels, respectively, and determining that a focusing state abnormality is caused when the focusing error signal exceeds the threshold level.

8. A method according to claim 7, further comprising the steps recording an examining signal with a definite frequency on a part of the land portion and on a part of the groove portion and setting the first and second threshold levels on the basis of the amplitude of a reproduction signal obtained by reproducing the examining signal.

9. An optical information recording/reproducing method for effecting recording of information on and/or reproduction of information from both a land portion and a groove portion provided on a recording medium with a light beam, said method comprising the steps of:

detecting reflected light of the light beam from the recording medium and generating a focusing error signal;

effecting a focusing servo for adjusting a focusing state of the light beam on the basis of the generated focusing error signal;

detecting reflected light of the light beam from the recording medium and generating a tracking error signal;

effecting a tracking servo for adjusting a tracking state of the light beam on the basis of the generated tracking error signal;

inverting the polarity of said tracking error signal so as to select a first mode in which said land portion is traced with the light beam or a second mode in which said groove portion is traced with the light beam;

setting a first threshold level for detecting tracking state abnormalities in the first mode and a second threshold level for detecting tracking state abnormalities in the second mode each independently; and comparing the tracking error signals generated in the first and second modes with the first and second threshold levels, respectively, and determining that a tracking state abnormality is caused when the tracking error signal exceeds the threshold level.

10. A method according to claim 9, further comprising the steps of recording an examining signal with a definite frequency on a part of the land portion and on a part of the groove portion and setting the first and second threshold levels on the basis of the amplitude of a reproduction signal obtained by reproducing the examining signal.

11. An optical information recording/reproducing method for effecting recording of information on and/or reproduction of information from both a land portion and a groove portion provided on a recording medium with a light beam, said method comprising the steps of:

detecting reflected light of the light beam from the recording medium with a sensor having a divided light-receiving surface and generating a focusing error signal;

effecting a focusing servo for adjusting a focusing state of the light beam on the basis of the generated focusing error signal;

detecting reflected light of the light beam from the recording medium and generating a tracking error signal;

effecting a tracking servo for adjusting a tracking state of the light beam on the basis of the generated tracking error signal;

inverting the polarity of said tracking error signal so as to select a first mode in which said land portion is traced with the light beam or a second mode in which said groove portion is traced with the light beam;

setting a first threshold level for detecting focusing state abnormalities in the first mode and a second threshold level for detecting focusing state abnormalities in the second mode each independently;

generating a sum signal from outputs of the divided light-receiving surfaces of said sensor in the first and second modes; and comparing the sum signals generated in the first and second modes with the first and second threshold levels, respectively, and determining that a focusing state abnormality is caused when the sum signal exceeds the threshold level.

12. An optical information recording/reproducing method for effecting recording of information on and/or reproduction of information from both a land portion and a groove portion provided on a recording medium with a light beam, said method comprising the steps of:

detecting reflected light of the light beam from the recording medium and generating a focusing error signal;

effecting a focusing servo for adjusting a focusing state of the light beam on the basis of the generated focusing error signal;

detecting reflected light of the light beam from the recording medium with a sensor having a divided light-receiving surface and generating a tracking error signal;

effecting a tracking servo for adjusting a tracking state of the light beam on the basis of the generated tracking error signal;

inverting the polarity of said tracking error signal so as to select a first mode in which said land portion is traced with the light beam or a second mode in which said groove portion is traced with the light beam;

setting a first threshold level for detecting tracking state abnormalities in the first mode and a second threshold level for detecting tracking state abnormalities in the second mode each independently;

generating a sum signal from outputs of the divided light-receiving surfaces of said sensor in the first and second modes; and comparing the sum signals generated in the first and second modes with the first and second threshold levels, respectively, and determining that a tracking state abnormality is caused when the sum signal exceeds the threshold level.

* * * * *

UNITED STATES PATENT AND TRADEMARK OFFICE
CERTIFICATE OF CORRECTION

PATENT NO.   :   5,953,296

DATED        :   September 14, 1999

INVENTOR(S)  :   HISATOSHI BABA

It is certified that error appears in the above-identified patent and that said Letters Patent is hereby corrected as shown below:

ON THE COVER PAGE:

IN SECTION [56], References Cited:

"6176404 6/1994" should read --6-176404 6/1994--.

COLUMN 6:

Line 60, "outputing" should read --output--.

COLUMN 14:

Line 21, "80%" should read --than 80%--.
   Line 43, "an" should read --a--.

Signed and Sealed this

Thirtieth Day of May, 2000

Attest:

Q. TODD DICKINSON

*Attesting Officer*          *Director of Patents and Trademarks*